Dec. 11, 1923.
J. F. MILLER
1,477,515
ICE CREAM FREEZER
Filed Nov. 6, 1922
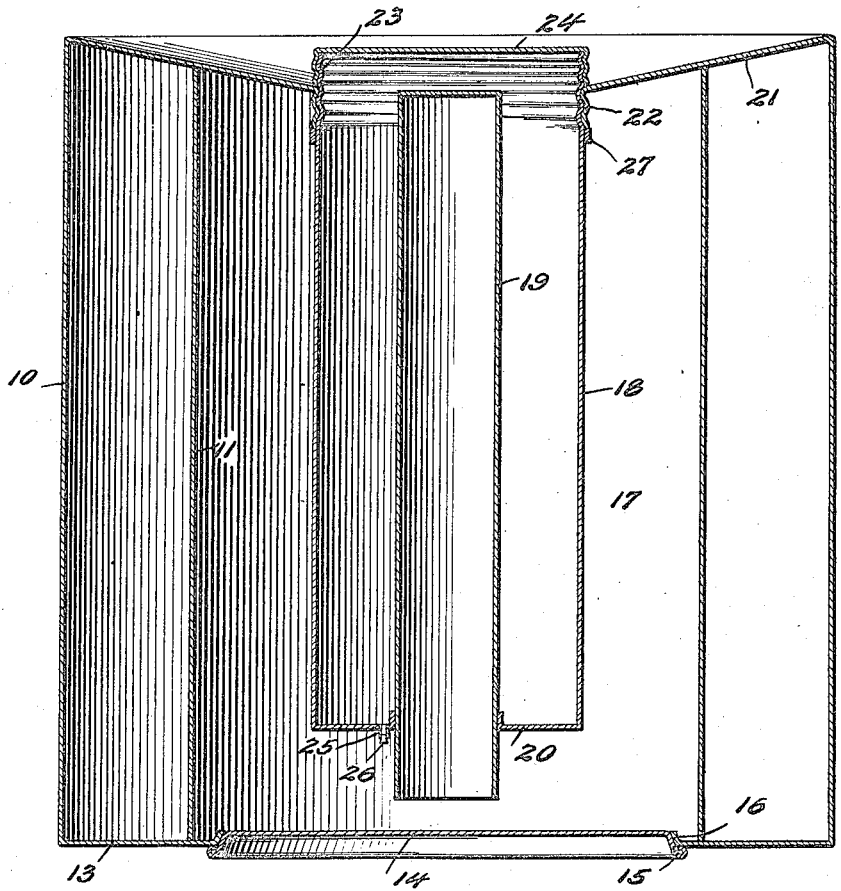

Patented Dec. 11, 1923.

1,477,515

UNITED STATES PATENT OFFICE.

JAMES FLOYD MILLER, OF MINDEN, LOUISIANA.

ICE-CREAM FREEZER.

Application filed November 6, 1922. Serial No. 599,410.

*To all whom it may concern:*

Be it known that I, JAMES FLOYD MILLER, a citizen of the United States, residing at Minden, Webster Parish, State of Louisiana, have invented certain new and useful Improvements in Ice-Cream Freezers, of which the following is a specification.

This invention relates to freezers for making ice cream, sherbet and other frozen edible things. It consists in a novel structural arrangement composed of simple, easily made, inexpensive parts so related as to give the greatest efficiency in freezing the material operated on with the minimum consumption of ice and time in the operation. The surfaces with which the material being frozen is in contact and through which its heat is adsorbed by the freezing material such as a mixture of ice and salt, have a very large area compared to the amount of material being treated and the amount of the freezing mixture used. It includes an outer vessel or container having a cylindrical chamber therein, the side walls being so constructed as to serve to protect the contents against the adsorption of heat through them by the outside air and a removable receptacle for the material to be frozen in the form of concentric cylinders suspended centrally in said chamber with the material causing the freezing in contact with its sides, bottom and inner cylindrical surface and a closure for the upper end of the chamber. The freezer embodying the invention furthermore does not require any operation to stir the material or any attention by the user during freezing after the parts have been properly assembled. It has a neat and attractive appearance, is portable and may be made of any desired size and when not in use may be easily taken apart, giving access to all portions for the purpose of cleaning. Its novel and advantageous features will be more fully understood from the following description and claims taken with the accompanying drawing.

One embodiment of the invention is shown in vertical section in the drawing.

In the embodiment of the invention shown in the drawing there is an outer vessel or container which includes parallel concentric cylindrical walls 10 and 11, the inner wall 11 being shorter than the outer wall with the lower ends of the walls on the same plane. A lower end closure 13 for the space between the walls is connected to them at their lower edges and extends a short distance inwardly beyond the inner wall 11 and has an edge flange 16 turned upwardly at a slight incline leaving an enlarged central circular opening at the bottom between the side walls. A detachable closure 14 having an edge flange 15 at a slight angle thereto fits in this opening with the flange 15 engaging the inner surface of flange 16.

The upper end closure 21 for the space between the cylinders 10 and 11 is connected to their upper edges and extends inwardly and downwardly from the outer edge of cylinder 10 on the lines of a rather flat cone and the inner edge 22 of this closure 21 extends a material distance inwardly beyond cylinder 11 and its inner edge is turned inwardly forming a cylindrical collar which is bent to form a rib in the form of a screw thread.

Within the chamber 17 formed by the inner cylinder 11 and the bottom closure 14 there is a cylindrical ice cream receptacle 18 which has extending centrally up through its closed lower end 20 a cylinder or pipe 19 which has a closed upper end a short distance below the upper end of the cylindrical container 18 and it has an open lower end below the lower end 20 of the ice cream container but above the bottom closure 14 of the chamber 17. The upper portion 23 of the cylinder 18 is screw threaded and of such size as to fit in and move through the opening surrounded by the collar 22 of the top closure 21 with its threads engaging the threads of that collar. At the lower end of the screw threaded portion of cylinder 28 there is a sleeve 27 surrounding it and in fixed position and this sleeve will abut the lower edge of the screw threaded collar 22 when the ice cream receptacle is moved upwardly by screw threaded engagement to its upper position. A cap 24 for closing the upper end of the ice cream receptacle is provided with screw threads engaging the screw threads on the cylinder 18 above the top wall 21. A small vent pipe 26 is secured in an opening in the bottom 20 of the ice cream receptacle and is provided with a valve 25 so as to admit a slight flow of air into the cylindrical chamber when inverted to remove the ice cream. It will be noted that the top of the ice cream chamber and its cap closure 24 are slightly below the outer edges of the top 21 of the device as a whole and that the ice cream receptacle may be removed from the chamber 17 by first removing the bottom closure 14 and then taking off cap 24 and turning the ice cream receptacle so as to disengage it from its screw threaded connection with the collar 22.

In operation the material to be frozen such as ice cream is first placed in the ice cream chamber 18 and as will be noted is in the form of a hollow cylinder with the closed end tube 19 extending upwardly through it. The end closure 24 is then placed in position and so turned as to make a tight closure preventing the escape of the cream and the device is then inverted and the chamber 17 is filled with cracked ice with salt or other freezing material and the pipe or cylinder 19 is also filled with this material for causing the freezing. It will be observed that this furnishes a very large area of contact between the cream and the chilled surfaces compared to the amount of cream used and thus the freezing takes place quickly and uniformly. The air tight space between the outer cylinders 10 and 11, of course, acts as a dead air space to prevent the freezing material from adsorbing heat laterally from the air.

What I claim as my invention and desire to secure by Letters Patent is:

1. An ice cream freezer comprising in combination a vessel having cylindrical double side walls spaced from each other forming a central heat insulated chamber adapted to receive ice, a removable cylindrical receptacle for the cream or other fluid to be frozen, having a closed lower end, a cylindrical tube with a closed upper end and an open lower end extending centrally of said receptacle from and through its lower end upwardly and secured thereto, means at the upper end of said chamber for supporting said cylindrical receptacle in said chamber with its lower end above the bottom thereof and closing the upper end of said chamber and means for closing the upper end of said receptacle.

2. An ice cream freezer comprising in combination a vessel having cylindrical double side walls spaced from each other and a removable bottom forming a central laterally heat insulated chamber adapted to receive ice, a removable cylindrical receptacle for the cream or other fluid to be frozen, having a closed lower end, a cylindrical tube with a closed upper end and an open lower end extending centrally of said receptacle from and through its lower end upwardly and secured thereto, a laterally and inwardly projecting member of sheet material having a central opening circular in outline extending from the upper end of the inner wall of said vessel for supporting said cylindrical receptacle in said chamber with its lower end above the bottom thereof and with said receptacle closing the upper end of said chamber and means for closing the upper end of said receptacle.

3. An ice cream freezer comprising in combination two concentric cylinders spaced from each other having air tight end walls connecting them, a closure for one end of the inner cylinder forming therewith a cylindrical chamber having one open end, a cylindrical member forming a cream receptacle of less length and materially less diameter than said inner cylinder in said chamber having a closed lower end and supported by a rigid laterally inwardly extending circular member of sheet material connected at its outer edge to the upper end of the inner wall of said chamber closing it and supporting said receptacle with its lower end materially above the bottom of said chamber and with its upper end extending a short distance above said laterally extending member.

4. An ice cream freezer comprising in combination two concentric cylinders spaced from each other having air tight end walls connecting them, a closure for one end of the inner cylinder forming therewith a cylindrical chamber having one open end, a cylindrical member forming a cream receptacle of less length and materially less diameter than said inner cylinder in said chamber having a closed lower end and supported by a rigid laterally extending circular member of sheet material connected at its outer edge to the upper end of the inner wall of said chamber closing it and supporting said receptacle with its lower end materially above the bottom of said chamber and with its upper end extending a short distance above said laterally extending member, a tube having a closed upper end and an open lower end extending centrally through the closed lower end of said receptacle to a plane near its upper end and a screw threaded cap like closure engaging the upper end of the cylindrical member above said laterally extending member.

5. An ice cream freezer comprising in combination a vessel having therein an open top cylindrical chamber adapted to receive ice, a receptacle for cream or other liquid to be frozen having concentric spaced cylindrical walls and a closed bottom, a circular closure with a central opening for the open top of said chamber secured in place at the upper edge of the inner wall of said vessel near its upper end adapted to support said receptacle concentrically in said chamber with its lower end above the bottom, a closure for the upper end of said receptacle and means for admitting air to the lower end of said receptacle and for controlling its admission.

6. An ice cream freezer comprising in combination, a vessel including concentric spaced cylindrical walls the inner being shorter than the outer, a bottom wall connecting their lower ends extending inwardly slightly beyond the inner wall with its inner edge turned upwardly at a slight inward incline, a circular closure with a similarly inclined edge fitting the inclined edges of said bottom wall forming with said wall an ice chamber, a top wall of conical form connecting the upper ends of said cylindrical walls and extending inwardly of the inner wall a material distance and having a central circuit opening, a cylindrical ice cream receptacle with a closed lower end concentrically in said chamber extending to a point near its bottom and detachably supported near its upper end from said top wall in said opening, and a closure for said receptacle above the inner edges of said top wall but below its outer margin.

7. An ice cream freezer comprising in combination, a vessel including concentric spaced cylindrical walls, the inner being shorter than the outer, a bottom wall connecting their lower ends, a detachable bottom closure circular in outline constituting a continuation of said bottom wall across the lower end of the inner cylinder forming an ice chamber, a top wall of conical form connecting the upper ends of said cylindrical walls extending inwardly of the space surrounded by the inner wall a material distance with its inner edge in the form of a down-turned screw threaded collar, a cylindrical ice cream receptacle having a closed lower end above the bottom of the chamber, and an open screw threaded upper end extending upwardly through and in screw threaded engagement with said collar and a screw threaded cap closure for the upper end of said receptacle above said collar but below the outer margin of the top closure.

8. An ice cream freezer comprising in combination, a vessel including concentric spaced cylindrical walls, the inner being shorter than the outer, a bottom wall connecting their lower ends, a detachable bottom closure circular in outline constituting a continuation of said bottom wall across the lower end of the inner cylinder forming an ice chamber, a top wall of conical form connecting the upper ends of said cylindrical walls extending inwardly of the space surrounded by the inner wall a material distance with its inner edge in the form of a down-turned screw threaded collar, a cylindrical ice cream receptacle having a closed lower end above the bottom of the chamber and an open screw-threaded upper end extending upwardly through and in screw threaded engagement with said collar and a screw threaded cap closure for the upper end of said receptacle above said collar but below the outer margin of the top closure, a fixed sleeve on said receptacle below its threads adapted to abut said collar and a tube having a closed upper end and open lower end extending upwardly in said receptacle to its upper end and through and supported by its lower end closure.

In testimony whereof I hereunto affix my signature.

JAMES FLOYD MILLER.